United States Patent
Colak Atan et al.

(10) Patent No.: US 11,505,637 B1
(45) Date of Patent: Nov. 22, 2022

(54) BLOCK COPOLYMERS WITH A POLYDIORGANOSILOXANE BLOCK AND A PHOSPHATE OR PHOSPHONATE CONTAINING BLOCK

(71) Applicant: 3M INNOVATIVE PROPERTIES COMPANY, St. Paul, MN (US)

(72) Inventors: Semra Colak Atan, Saint Louis Park, MN (US); Federica Sgolastra, Woodbury, MN (US); George W. Griesgraber, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/753,262

(22) PCT Filed: Sep. 11, 2020

(86) PCT No.: PCT/IB2020/058475
§ 371 (c)(1),
(2) Date: Feb. 25, 2022

(87) PCT Pub. No.: WO2021/059072
PCT Pub. Date: Apr. 1, 2021

Related U.S. Application Data

(60) Provisional application No. 62/904,862, filed on Sep. 24, 2019.

(51) Int. Cl.
*C08F 293/00* (2006.01)
*C09D 153/00* (2006.01)

(52) U.S. Cl.
CPC ........ *C08F 293/005* (2013.01); *C09D 153/00* (2013.01); *C08F 2438/03* (2013.01)

(58) Field of Classification Search
CPC .......................... C08F 293/00; C08F 293/005
See application file for complete search history.

(56) References Cited

U.S. PATENT DOCUMENTS 5,627,296 A    5/1997   Dauth

FOREIGN PATENT DOCUMENTS

| JP | 09296019 | 11/1997 |
|----|----------|---------|
| JP | 2013103993 | 5/2013 |
| WO | WO 2018-013330 | 1/2018 |
| WO | WO 2019-123124 | 6/2019 |
| WO | WO 2020-128732 | 6/2020 |
| WO | WO 2020-128860 | 6/2020 |

OTHER PUBLICATIONS

Youssef, "Free-Radical Synthesis of New Phosphorus Containing Silane Monomers and Polysiloxanes", European Polymer Journal, 1998, vol. 34, No. 11, pp. 1649-1655.
Suzuki, "Synthesis of Soluble Phosphate Polymers by RAFT and Their In Vitro Mineralization", Biomacromolecules, 2006, vol. 06, pp. 3178-3187.
Sun, "Functionalization of Surfaces With Branched Polymers", Royal Society of Chemistry Advances, 2016, vol. 06, No. 48, p. 42089-42108.
Schönherr, "Self-Assembled Monolayers of Symmetrical and Mixed Alkyl Fluoroalkyl Disulfides on Gold. 1. Synthesis of Disulfides and Investigation of Monolayer Properties", Langmuir, 1996, vol. 12, pp. 3891-3897.
International Search Report for PCT International Application No. PCT/IB2020/058475, dated Dec. 4, 2020, 4 pages.

*Primary Examiner* — Jeffrey C Mullis
(74) *Attorney, Agent, or Firm* — Jean A. Lown

(57) ABSTRACT

A block copolymer is provided that includes a first block having pendant phosphate and/or phosphonate groups and a second block that contains pendant poly(dialkylsiloxane) groups. Compositions containing the block copolymer as well as articles that include the block copolymer are also provided. The block copolymer can be used to provide a surface that is easy to clean and/or that is resistant to oil and grease without the use of fluorinated materials.

13 Claims, No Drawings

BLOCK COPOLYMERS WITH A POLYDIORGANOSILOXANE BLOCK AND A PHOSPHATE OR PHOSPHONATE CONTAINING BLOCK

CROSS REFERENCE TO RELATED APPLICATIONS

This application is a national stage filing under 35 U.S.C. 371 of PCT/IB2020/058475, filed Sep. 11, 2020, which claims the benefit of U.S. Provisional Patent Application No. 62/904,862, filed Sep. 24, 2019, the disclosure of which is incorporated by reference in its/their entirety herein.

BACKGROUND

Stainless steel is ubiquitous in commercial kitchens, home kitchens, office buildings, airports, and various other public spaces. Most cleaning products designed for use on stainless steel surfaces are both cleaners and polishers (including mixtures of mineral oil and water, or solvent and mineral oil). The oil in these products helps hide fingerprints by blending/covering them with the applied mineral oil. The oily layer provides the substrate a shiny appearance.

Stainless steel products that utilize this clean and polish approach often suffer from many drawbacks such as any one or more of the following: 1) streaking (e.g., it is difficult to get a streak-free shine); difficult to "spot clean" a portion of the surface (e.g., users typically have to clean an entire area to maintain a uniform oil layer), 2) the product dries slowly, and the appearance changes during drying, 3) attraction to dirt (e.g., oiled surfaces collect lint and dust easily), 4) oil build-up (e.g., mineral oil left on surfaces can accumulate and is difficult to remove), and 5) the inability to cut tough stains commonly found in restrooms.

Although there are commercial products available, there is still a need for compositions that can coat, protect, and optionally clean stainless steel surfaces and other metal surfaces.

SUMMARY

A block copolymer is provided that includes a first block having pendant phosphorous-containing groups and a second block having pendant poly(dialkylsiloxane) groups. Compositions containing the block copolymer as well as articles that include the block copolymer are also provided. The block copolymer can be used to provide a surface that is easy to clean and/or that is resistant to oil and grease without the use of fluorinated materials.

In a first aspect, a block copolymer is provided. The block copolymer contains at least one A block and at least one B block. The A block contains multiple monomeric units derived from a first monomer comprising a (meth)acryloyl group and a phosphorous-containing group. The B block contains multiple monomer units derived from a second monomer comprising a (meth)acryloyl group and a poly (dialkylsiloxane) group.

In a second aspect, a coating composition is provided that includes a) a block copolymer as described above in the first aspect and b) an organic solvent. The block copolymer is dissolved or dispersed in the organic solvent.

In a third aspect, an article is provided that includes a) a substrate and b) a coating layer (e.g., a hardened or dried coating layer) positioned adjacent to the substrate, wherein the coating layer contains a block copolymer as described above in the first aspect.

In a fourth aspect, a method of coating a substrate is provided. The method includes providing a coating composition that includes a) a block copolymer as described in the first aspect and b) an organic solvent. The block copolymer is dissolved or dispersed in the organic solvent.

The method further includes applying the coating composition to the substrate. The method still further includes drying the coating composition to form a dried (or hardened) coating layer that is adjacent to the substrate.

DETAILED DESCRIPTION

Block copolymers having a first block (i.e., an A block) with pendant phosphorous-containing groups and having a second block (i.e., a B block) with pendant poly(dialkylsiloxane) groups are provided. Both blocks are derived from (meth)acrylate monomers. That is, the block copolymer is a (meth)acrylate-based block copolymer. The block copolymers can be applied to various surfaces such as metal-containing surfaces to provide protection against fingerprints and other types of oily substances and to enhance the ease of cleaning after exposure to oily substances. A coating of the block copolymer can advantageously adhere to various surfaces such as metal-containing surfaces through the A block and provide oil repellency through the B block.

Definitions

As used herein, "alkyl" refers to a monovalent group that is a radical of an alkane and includes straight chain, branched, cyclic, and bicyclic alkyl groups, and combinations thereof.

Unless otherwise indicated, the alkyl groups typically contain from 1 to 20 carbon atoms. In some embodiments, the alkyl groups contain 1 to 10 carbon atoms, 2 to 10 carbon atoms, 1 to 6 carbon atoms, 2 to 6 carbon atoms, 1 to 4 carbon atoms, or 2 to 4 carbon atoms. Cyclic alkyl groups and branched alkyl groups have at least three carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 20 carbon atoms. In some embodiments, the alkylene group has 1 to 10 carbon atoms, 2 to 10 carbon atoms, 1 to 6 carbon atoms, 2 to 6 carbon atoms, 1 to 4 carbon atoms, or 2 to 4 carbon atoms. Cyclic and branched alkylene groups have at least 3 carbon atoms. Suitable alkylene groups include, for example, methylene, ethylene, propylene, 1,4-butylene, 1,4-cyclohexylene, and 1,4-cyclohexyldimethylene.

The term "heteroalkylene" refers to an alkylene groups that have at least one —CH$_2$— group replaced with a heteroatom such as sulfur, oxygen, or nitrogen. The heteroatom is typically in the form of an oxy group (—O—), thio group (—S—), or —NH— group. The heteroalkylene typically has at least one carbon atom (—CH$_2$— group) on either side of each heteroatom.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to or connected to the aromatic ring. Unless otherwise indicated, the aryl groups typically contain from 6 to 20 carbon atoms. In some embodiments, the aryl groups contain 6 to 18, 6 to 16, 6 to 12, or 6 to 10 carbon atoms. Examples of an aryl group include phenyl, naphthyl, biphenyl, phenanthryl, and anthracyl.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms, and an aryl portion often has 6 to 20 carbon atoms, 6 to 18 carbon atoms, 6 to 16 carbon atoms, 6 to 12 carbon atoms, or 6 to 10 carbon atoms.

The term "(meth)acryloyl" refers to a monovalent group of formula $CH_2=CR-(CO)-$ where R is hydrogen for an acryloyl group and methyl for a methacryloyl group and where $-(CO)-$ refers to a carbonyl group.

A "phosphorous-containing group" refers to a phosphonate group, phosphate group, phosphonic acid group, phosphoric acid group, phosphonic acid ester group, or phosphoric acid ester group.

A "phosphonate" group is an anion of formula $-PO_3^{-2}$ or $-PO_3H-$ where the charge of the anion is balanced with a cation.

A "phosphate" group is an anion of the formula $-PO_4H-$ or $-PO_4^{-2}$ where the charge of the anion is balanced with a cation.

A "phosphonic acid" is a group of the formula $-PO(OH)_2$.

A "phosphoric acid" is a group of the formula $-OPO(OH)_2$.

A "phosphonic acid ester" is a group of formula $-PO(OR^{20})_2$ where $R^{20}$ is alkyl or aralkyl.

A "phosphoric acid ester" is a group of formula $-OPO(OR^{20})_2$ where $R^{20}$ is alkyl or aralkyl.

A "coating" may be a layer of a coating composition that includes a polymeric material and a liquid (e.g., water and/or organic solvent) or that has been dried (e.g., hardened) by removal of the liquid. The coating layer is typically applied adjacent to a surface of a substrate.

A coating composition of the present disclosure may be in a "ready-to-use" form or a "concentrated" form. That is, the coating composition includes a polymeric material and optionally a liquid (e.g., water and/or organic solvent). Herein, a "ready-to-use" composition is one that is not diluted before coating or otherwise applied to a surface. In contrast, a "concentrated" composition is one that is diluted before coating or otherwise applied to a surface. Dilutions typically seen are 1:1 to 1:500, wherein 1 part of concentrate is added to at least 1 part liquid or up to 500 parts liquid (e.g., water and/or organic solvent).

The term "adjacent" can be used to refer to two materials that are in direct contact, and which can be in the form of layers, such as a coating (in liquid or dried (hardened) form) on a metal substrate, or a coating (typically in liquid form) on a fibrous substrate.

The terms "comprise", "contain", "include", and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether they materially affect the activity or action of the listed elements. Any of the elements or combinations of elements that are recited in this specification in open-ended language (e.g., comprise, include, contain, and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or both. For example, the expression A and/or B means A alone, B alone, or both A and B.

Also, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

As used herein, the term "room temperature" refers to a temperature of 20° C. to 25° C. or 22° C. to 25° C.

The term "in the range" or "within a range" (and similar statements) includes the endpoints of the stated range.

Block Copolymer

A block copolymer is provided that includes at least one A block and at least one B block. The block copolymer can have more than one A block and/or more than one B block. In many embodiments the block copolymer has two B blocks and one A block that is positioned between the two B blocks. That is, the block copolymer is a BAB block copolymer. The BAB block copolymers may be particularly effective for treatment of metal surfaces because the A block in the center of the block copolymer has a phosphorous-containing group that can be attached to metal surfaces. The two outer B blocks contain pendant poly(dialkylsiloxane) groups that can provide oil repellency.

Typically, most of the monomers used to form the block copolymer have a (meth)acryloyl group. For example, greater than 50 mole percent, greater than 60 mole percent, greater than 70 mole percent, greater than 80 mole percent, greater than 90 mole percent, greater than 95 mole percent, greater than 97 mole percent, greater than 98 mole percent, greater than 99 mole percent, or 100 mole percent of the monomers used to form the block copolymer have a (meth)acryloyl group. The monomers can be (meth)acrylates (i.e., (meth)acrylic acid esters), (meth)acrylamides, (meth)acrylic acids, and combinations thereof.

The monomeric units in the A block are derived from first monomers having both a (meth)acryloyl group and a phosphorous-containing group. In many embodiments, the first monomers are of Formula (I).

$$CH_2=CR^1-(CO)-X-R^2-[-Q^1-R^3-]_m-Y \qquad (I)$$

In Formula (I), $R^1$ is hydrogen or methyl and $X^1$ is oxy- or —NH—. Group $R^2$ is an alkylene or heteroalkylene and group R is an alkylene. Group $Q^1$ is selected from —(CO)—$X^2$— or —$NR^4$—(CO)—$X^2$— where each $X^2$ is independently oxy (—O—) or —$NR^4$— and $R^4$ is independently hydrogen or alkyl. The variable m is 0 or 1. Group Y is phosphorous-containing group selected from a phosphonic acid, phosphonate, phosphonic acid ester, phosphoric acid, phosphate, or phosphoric acid ester. The group —(CO)—$X^1$—$R^2$-[$Q^1$-$R^3$—]$_m$—Y can be considered as the pendant group of the first monomer.

When $R^1$ is hydrogen and $X^1$ is oxy, the monomer of Formula (I) is an acrylate. When $R^1$ is methyl and $X^1$ is oxy, the monomer is a methacrylate. When $R^1$ is hydrogen and $X^1$ is —NH—, the monomer is an acrylamide and when $R^1$ is methyl and $X^1$ is —NH—, the monomer is a methacrylamide.

Group $R^2$ is an alkylene or heteroalkylene. Suitable alkylene groups often have 1 to 20 carbon atoms, 1 to 10 carbon atoms, 1 to 6 carbon atoms, or 1 to 4 carbon atoms. Suitable heteroalkylene groups often contain one or more heteroatoms elected from oxygen (—O—) or nitrogen (—NH—). In some embodiments, the heteroalkylene contains 2 to 20 carbon atoms, 2 to 10 carbon atoms, 2 to 6 carbon atoms, or 2 to 4 carbon atoms and 1 to 5 heteroatoms, 1 to 4 heteroatoms, of 1 to 3 heteroatoms.

Group $Q^1$ is selected from —(CO)—$X^2$— or —$NR^4$—(CO)—$X^2$— where $X^2$ is oxy or —$NR^4$—. That is, $Q^1$ is —(CO)—O—, —(CO)—$NR^4$—, —$NR^4$—(CO)—$NR^4$—, or —$NR^4$—(CO)—O— where $R^4$ is hydrogen or alkyl. Suitable alkyl groups for $R^4$ often have 1 to 10 carbon atoms, 1 to 6 carbon atoms, or 1 to 4 carbon atoms. In some embodiments, $R^4$ is hydrogen or methyl. Group $R^4$ is often hydrogen.

Group $R^3$ is an alkylene. Suitable alkylene groups typically have 1 to 10 carbon atoms, 1 to 6 carbon atoms, or 1 to 4 carbon atoms.

Group Y is phosphorous-containing group selected from a phosphonic acid, phosphonic acid ester, phosphonate, phosphoric acid, phosphoric acid ester, or phosphate. Any anionic group (e.g., phosphate or phosphonate) is charge balanced with a cationic group.

When m is equal to 0, the first monomer of Formula (I) is of Formula (I-A).

$$CH_2=CR^1-(CO)-X^1-R^2-Y \qquad (I\text{-}A)$$

When m is equal to 1, the first monomer of Formula (I) is of Formula (I-B).

$$CH_2=CR^1-(CO)-X^1-R^2-Q-R^3-Y \qquad (I\text{-}B)$$

The groups $R^1$, $X^1$, $R^2$, $R^3$, and Y are the same as for Formula (I).

The first monomer of Formula (I-A) can be a (meth)acrylate of Formula (I-1) or a (meth)acrylamide of Formula (I-2).

$$CH_2=CR^1-(CO)-O-R^2-Y \qquad (I\text{-}1)$$

$$CH_2=CR^1-(CO)-NH-R^2-Y \qquad (I\text{-}2)$$

The groups $R^1$, $R^2$, and Y are the same as described above for monomers of Formula (I).

The first monomers of Formula (I-A) having a phosphonic acid ester group can be prepared, for example, by reaction of (meth)acryloyl chloride with an equimolar amount of $HX^1-R^2-PO(OR^a)_2$ to form a first monomer of formula $CH_2=CR^1-(CO)-X^1-R^2-PO(OR^a)_2$. In this formula, $R^a$ is a hydrogen or an alkyl, $X^1$ is oxy or —NH—, and $R^2$ is alkylene or heteroalkylene. Suitable examples of compounds of formula $HX^1-R^2-PO(OR^a)_2$ include hydroxyethylphosphonate dimethyl ester, aminomethyl phosphonic acid, aminoethyl phosphonic acid, and aminoproyl phosphonic acid.

The first monomers of Formula (I-A) having a phosphonic acid group can be formed from the first monomer of formula $CH_2=CR^1-(CO)-X^1-R^2-PO(OR^a)_2$ having a phosphonic acid ester group. The phosphonic acid ester-containing monomer can be treated with bromotrimethylsilane to form an intermediate of formula $CH_2=CR^1-(CO)-X^1-R^2-PO(OSi(CH_3)_3)_2$ that is subsequently treated with an alcohol such as methanol to form the first monomer of formula $CH_2=CR^1-(CO)-O-R^2-PO(OH)_2$. Depending on the pH, the phosphonic acid group can become a phosphonate salt. For example, the phosphonic acid group can be treated with a base to be converted into a phosphonate salt.

First monomers of Formula (I-A) having a phosphoric acid ester group can be prepared, for example, by initially reacting (meth)acryloyl chloride with $HX^1-R^2-O-PO(OR^a)_2$ to form the first monomer of formula $CH_2=CR^1-(CO)-X^1-R-O-PO(OR^a)_2$. Suitable examples of compounds of formula $HX^1-R^2-O-PO(OR^a)_2$ include diethyl 2-hydroxyethyl phosphate.

The first monomers of Formula (I-A) having a phosphoric acid group can be formed from the first monomer of formula $CH_2=CR^1-(CO)-X^1-R-O-PO(OR^a)_2$ having a phosphoric acid ester group. The phosphoric acid ester-containing monomer can be treated with bromotrimethylsilane to form an intermediate of formula $CH_2=CR^1-(CO)-X^1-R^2-O-PO(OSi(CH_3)_3)_2$ that is subsequently treated with an alcohol such as methanol to form the first monomer of formula $CH_2=CR^1-(CO)-O-R^2-O-PO(OH)_2$. Depending on the pH, the phosphoric acid group can become a phosphate salt. For example, the phosphoric acid group can be treated with a base to be converted into a phosphate salt.

The first monomer of Formula (I-B) can be a (meth)acrylate of Formula (I-3) or a (meth)acrylamide of Formula (I-4).

$$CH_2=CR^1-(CO)-O-R^2-Q^1-R^3-Y \qquad (I\text{-}3)$$

$$CH_2=CR^1-(CO)-NH-R^2-Q^1-R^3-Y \qquad (I\text{-}4)$$

The groups $R^1$, $R^2$, $Q^1$, $R^3$, and Y are the same as for Formula (I).

The $Q^1$ group in the first monomers of Formula (I-B) can be of formula —(CO)—O—, —(CO)—$NR^4$—, —$NR^4$—(CO)—$NR^4$—, or —$NR^4$—(CO)—O— where $R^4$ is hydrogen or alkyl. Thus, the (meth)acrylate of Formula (I-3) can be of Formula (I-5), (I-6), (I-7), or (I-8)

$$CH_2=CR^1-(CO)-O-R^2-(CO)-O-R^3-Y \qquad (I\text{-}5)$$

$$CH_2=CR^1-(CO)-O-R^2-(CO)-NR^4-R^3-Y \qquad (I\text{-}6)$$

CH$_2$=CR$^1$—(CO)—O—R$^2$—NR$^4$—(CO)—NR$^4$—R$^3$—Y (I-7)

CH$_2$=CR$^1$—(CO)—O—R$^2$—NR$^4$—(CO)—O—R$^3$—Y (I-8)

Likewise, the (meth)acrylamide of Formula (I-4) can be of Formula (I-9), (I-10), (I-11), or (I-12).

CH$_2$=CR$^1$—(CO)—NH—R$^2$—(CO)—O—R$^3$—Y (I-9)

CH$_2$=CR$^1$—(CO)—NH—R$^2$—(CO)—NR$^4$—R$^3$—Y (I-10)

CH$_2$=CR$^1$—(CO)—NH—R$^2$—NR$^4$—(CO)—NR$^4$—R$^3$—Y (I-11)

CH$_2$=CR$^1$—(CO)—NH—R$^2$—NR$^4$—(CO)—O—R$^3$—Y (I-12)

Some specific example monomers of either Formula (I-7) or Formula (I-8) are of Formula (I-13)

CH$_2$=CR$^1$—(CO)—O—CH$_2$CH$_2$—NH—(CO)—X$^2$—R$^3$—Y (I-13)

where R$^2$ is equal to —CH$_2$CH$_2$— and Q$^1$ is equal to —NH—(CO)—X$^2$—. Group X$^2$ is oxy or —NR$^4$— (e.g., —NH—). Such monomer can be prepared, for example, by reaction of 2-isocyanatoethyl (meth)acrylate with a compound of formula HX$^2$—R$^3$—PO(OR$^a$)$_2$ or HX$^2$—R$^3$—O—PO(OR$^a$)$_2$. Other isocyanatoalkyl (meth)acrylates can be used in place of 2-isocyanatoethyl (meth)acrylate to provide alternatives to —CH$_2$CH$_2$— as the R$^2$ group. Examples of suitable compounds of formula HX$^2$—R$^3$—PO(OR$^a$)$_2$ include hydroxyethylphosphonate dimethyl ester, aminomethyl phosphonic acid, aminoethyl phosphonic acid, aminopropyl phosphonic acid. Suitable examples of compounds of formula HX$^2$—R$^3$—O—PO(OR$^a$)$_2$ include diethyl 2-hydroxyethyl phosphate. The resulting monomers are phosphonic acid ester-containing monomers of formula CH$_2$=CR$^1$—(CO)—O—CH$_2$CH$_2$—NH—(CO)—X$^2$—R$^3$—PO(OR$^a$)$_2$ or phosphoric acid ester-containing monomers of formula CH$_2$=CR$^1$—(CO)—O—CH$_2$CH$_2$—NH—(CO)—X$^2$—R$^3$—O—PO(OR$^a$)$_2$. Either of these monomers can be reacted with bromotrimethylsilane and then treated with an alcohol such as methanol to form phosphonic acid-containing monomers of formula CH$_2$=CR$^1$—(CO)—O—CH$_2$CH$_2$—NH—(CO)—X$^2$—R$^3$—PO(OH)$_2$ or phosphoric acid-containing monomers of formula CH$_2$=CR$^1$—(CO)—O—CH$_2$CH$_2$—NH—(CO)—X$^2$—R$^3$—O—PO(OR)$_2$.

Some specific example monomers of Formula (I-9) or (I-10) are of Formula (I-14) where R$^2$ is equal to —C(CH$_3$)$_2$— and Q$^1$ is equal to —(CO)—X$^2$— wherein X$^2$ is oxy or —NR$^4$— (e.g., —NH—).

CH$_2$=CR$^1$—(CO)—NH—C(CH$_3$)$_2$—(CO)—X$^2$—R$^3$—Y (I-14)

Such monomers can be prepared by reaction of vinyl dimethyl azlactone (VDM) with a compound of formula HX$^2$—R$^3$—PO(OR$^a$)$_2$ or HX$^2$—R$^3$—O—PO(OR$^a$)$_2$. Examples of suitable compounds of formula HX$^2$—R$^3$—PO(OR$^a$)$_2$ and of formula HX$^2$—R$^3$—O—PO(OR$^a$)$_2$ are the same as described above.

The resulting monomers of are phosphonic acid ester-containing monomers of formula CH$_2$=CR$^1$—(CO)—NH—C(CH$_3$)$_2$—(CO)—X$^2$—R$^3$—PO(OR$^a$)$_2$ or phosphoric acid ester-containing monomers of formula CH$_2$=CR$^1$—(CO)—NH—C(CH$_3$)$_2$—(CO)—X$^2$—R$^3$—O—PO(OR)$_2$. Either of these monomers can be reacted with bromotrimethylsilane and then treated with an alcohol such as methanol to form a phosphonic acid-containing monomer or phosphoric acid-containing monomer of phosphonic acid-containing monomers of formula CH$_2$=CR$^1$—(CO)—NH—C(CH$_3$)$_2$—(CO)—X$^2$—R$^3$—PO(OH)$_2$ or phosphoric acid-containing monomers of formula CH$_2$=CR$^1$—(CO)—NH—C(CH$_3$)$_2$—(CO)—X$^2$—R$^3$—O—PO(OH)$_2$.

The monomeric units in the B block are derived from second monomers having both a (meth)acryloyl group and a monovalent poly(dialkylsiloxane) group. The poly(dialkylsiloxane) group, which is referred to herein as group Z, is typically of Formula (III).

—Si(R$^8$)$_2$—O—[—Si(R$^8$)$_2$—O—]$_p$—Si(R$^8$)$_2$R$^9$ (III)

In Formula (III), each R$^8$ is an alkyl, R$^9$ is an alkyl, and p is an integer that is greater than or equal to 0. Suitable alkyl groups for R$^8$ can have 1 to 10 carbon atoms, 1 to 6 carbon atoms, 1 to 4 carbon atoms, or 1 to 3 carbon atoms. R$^8$ is often methyl. Suitable alkyl groups for R$^9$ can have 1 to 20 carbon atoms, 1 to 16 carbon atoms, 1 to 12 carbon atoms, 1 to 10 carbon atoms, 1 to 6 carbon atoms, or 1 to 4 carbon atoms. The variable p is usually equal to at least 5, at least 10, at least 20, at least 40, at least 60, at least 80, or at least 100 and can be up to 800, up to 700, up to 600, up to 500, up to 400, up to 300, up to 200, or up to 100.

The second monomer is often of Formula (II).

CH$_2$=CR$^5$—(CO)—X$^3$—R$^6$-[-Q$^2$-R$^7$—]$_n$—Z (II)

In Formula (II), R$^5$ is hydrogen or methyl, group X$^3$ is oxy or —NH—, group R$^6$ is an alkylene or heteroalkylene, and group R$^7$ is an alkylene. Group Q$^2$ is —(CO)X$^4$— or —NR—(CO)—X$^4$— where X$^4$ is oxy or —NR$^8$— and group R$^8$ is hydrogen or alkyl. The variable n is equal to 0 or 1. Group Z is a monovalent poly(dialkylsiloxane) group as defined above.

When R is hydrogen and X$^3$ is oxy, the monomer of Formula (II) is an acrylate. When R$^5$ is methyl and X$^3$ is oxy, the monomer is a methacrylate. When R$^5$ is hydrogen and X$^3$ is —NH—, the monomer is an acrylamide and when R$^5$ is methyl and X$^3$ is —NH—, the monomer is a methacrylamide.

Group R$^6$ is an alkylene or heteroalkylene. Suitable alkylene groups often have 1 to 20 carbon atoms, 1 to 10 carbon atoms, 1 to 6 carbon atoms, or 1 to 4 carbon atoms. Suitable heteroalkylene groups often contain one or more heteroatoms elected from oxygen (—O—) or nitrogen (—NH—). In some embodiments, the heteroalkylene contains 2 to 20 carbon atoms, 2 to 10 carbon atoms, 2 to 6 carbon atoms, or 2 to 4 carbon atoms and 1 to 5 heteroatoms, 1 to 4 heteroatoms, of 1 to 3 heteroatoms.

Group Q$^2$ is selected from —(CO)—X$^4$— or —NR—(CO)—X$^4$— where X$^4$ is oxy or —NR—. That is, Q$^2$ is —(CO)—O—, —(CO)—NR—, —NR—(CO)—NR—, or —NR—(CO)—O— where R$^8$ is hydrogen or alkyl. Suitable alkyl groups for R$^8$ often have 1 to 10 carbon atoms, 1 to 6 carbon atoms, or 1 to 4 carbon atoms. In some embodiments, R$^8$ is hydrogen or methyl. R$^8$ is often hydrogen.

Group R$^7$ is an alkylene. Suitable alkylene groups typically have 1 to 10 carbon atoms, 1 to 6 carbon atoms, or 1 to 4 carbon atoms.

When the variable n in Formula (II) is equal to 0, the second monomer of Formula (II) is of Formula (II-A) or (II-B).

CH$_2$=CR$^5$—(CO)—X$^3$—R$^6$—Z (II-A)

CH$_2$=CR$^5$—(CO)—X$^3$—R$^6$-Q$^2$-R$^7$—Z (II-B)

The groups R$^5$, R$^6$, X$^3$, and Z are the same as described above for monomers of Formula (II).

The second monomer of Formula (II-A) can be a (meth)acrylate of Formula (II-1) or a (meth)acrylamide of Formula (II-2).

$$CH_2=CR^5-(CO)-O-R^6-Z \quad (II-1)$$

$$CH_2=CR^5-(CO)-NH-R^6-Z \quad (II-2)$$

The groups $R^5$, $R^6$, and Z are the same as described above for monomers of Formula (II).

The second monomers of Formula (II-A) are commercially available from, for example, Gelest (Morrisville, Pa., USA) under the product code "MCR". Additionally, the second monomer of Formula (II-A) can be prepared, for example, by reaction of (meth)acryloyl chloride with an equimolar amount of a compound of formula H—$X^3$—$R^6$—Z where $X^3$, $R^6$, and Z are the same as defined above. Suitable examples of the compound of H—$X^3$—$R^6$—Z include α-monoaminopropyl terminated polydimethylsiloxane and α-monohydroxypropyl terminated polydimethylsiloxane.

Suitable commercially α-monoaminopropyl polydimethylsiloxanes and α-monohydroxypropyl terminated polydimethylsiloxane are commercially available from Gelest.

The second monomer of Formula (II-B) can be a (meth)acrylate of Formula (II-3) or a (meth)acrylamide of Formula (II-4).

$$CH_2=CR^5-(CO)-O-R^6-Q^2-R^7-Z \quad (II-3)$$

$$CH_2=CR^5-(CO)-NH-R^6-Q^2-R^7-Z \quad (II-4)$$

The groups $R^5$, $R^6$, $Q^2$, $R^7$, and Z are the same as for Formula (II).

The $Q^2$ group in the first monomers of Formula (I-B) can be of formula —(CO)—$X^4$— or —$NR^8$—(CO)—$X^4$—. Group $X^4$ is oxy or —NR— and group $R^8$ is hydrogen or alkyl. Thus, the (meth)acrylate of Formula (II-3) can be of Formula (II-5), (II-6), (II-7), or (II-8).

$$CH_2=CR^5-(CO)-O-R^6-(CO)-O-R^7-Z \quad (II-5)$$

$$CH_2=CR^5-(CO)-O-R^6-(CO)-NR^8-R^7-Z \quad (II-6)$$

$$CH_2=CR^5-(CO)-O-R^6-NR^8-(CO)-O-R^7-Z \quad (II-7)$$

$$CH_2=CR^5-(CO)-O-R^6-NR^8-(CO)-NR^8-R^7-Z \quad (II-8)$$

Likewise, the (meth)acrylamide of Formula (II-4) can be of Formula (II-9), (II-10), (II-11), or (II-12).

$$CH_2=CR^5-(CO)-NH-R^6-(CO)-O-R^7-Z \quad (II-9)$$

$$CH_2=CR^5-(CO)-NH-R^6-(CO)-NR^8-R^7-Z \quad (II-10)$$

$$CH_2=CR^5-(CO)-NH-R^6-NR^8-(CO)-O-R^7-Z \quad (II-11)$$

$$CH_2=CR^5-(CO)-NR-(CO)-NR^8-R^7-Z \quad (II-12)$$

Some specific example monomers of Formula (II-7) or (II-8) are of Formula (II-13)

$$CH_2=CR^5-(CO)-O-CH_2CH_2-NH-(CO)-X^4-R^7-Z \quad (II-13)$$

where $R^6$ is equal to —$CH_2CH_2$— and $Q^2$ is equal to —NH—(CO)—$X^4$— where $X^4$ is oxy or —$NR^8$— (e.g., —NH—). Such monomer can be prepared, for example, by reaction of 2-isocyanatoethyl (meth)acrylate with a compound of formula $HX^4$—$R^7$—Z. Other isocyanatoalkyl (meth)acrylates can be used in place of 2-isocyanatoethyl (meth)acrylate to provide alternatives to —$CH_2CH_2$— as the $R^6$ group. Examples of suitable compounds of formula $HX^4$—$R^7$—Z include α-monoaminopropyl polydimethylsiloxanes and α-monohydroxypropyl terminated polydimethylsiloxane such as those that are commercially available from Gelest.

Some specific example monomers of Formula (II-9) or (II-10) are of Formula (II-14) where $R^6$ is equal to —$C(CH_3)_2$— and $Q^2$ is equal to —(CO)—$X^4$— wherein $X^4$ is oxy or —NR— (e.g., —NH—).

$$CH_2=CR^5-(CO)-NH-C(CH_3)_2-(CO)-X^4-R^7-Z \quad (II-14)$$

Such monomers can be prepared by reaction of vinyl dimethyl azlactone (VDM) with a compound of formula $HX^4$—$R^7$—Z. Examples of suitable compounds of formula $HX^4$—$R^7$—Z include α-monoaminopropyl polydimethylsiloxanes and α-monohydroxypropyl terminated polydimethylsiloxane such as those that are commercially available from Gelest.

The second monomer usually has a weight average molecular weight in a range of 500 Daltons to 50,000 Daltons. For example, the weight average molecular weight can be at least 500 Daltons, at least 1,000 Daltons, at least 2,000 Daltons, at least 5,000 Daltons, or at least 10,000 Daltons and up to 50,000 Daltons, up to 40,000 Daltons, up to 20,000 Daltons, up to 10,000 Daltons, up to 5,000 Daltons, or up to 2,000 Daltons. Some second monomers have a weight average molecular weight in a range of 500 to 20,000 Daltons, 500 to 10,000 Daltons, 500 to 5,000 Daltons, or 500 to 2,000 Daltons.

Any suitable method can be used to form the block copolymers, which are usually BAB block copolymers. In many embodiments, the block copolymers are formed using a photoinitiator with two terminal dithiocarbamate or dithiocarbonate groups. Such photoinitiators allow for controlled growth of each polymeric block to the desired weight average molecular weight. Suitable photoinitiators can be of Formula (IV).

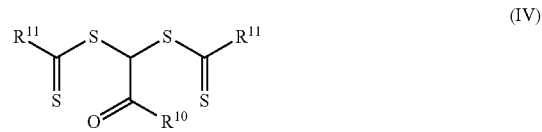

(IV)

In Formula (IV), the group $R^{10}$ is an alkyl, alkoxy, or group of formula —$N(R^{12})_2$ where each $R^{12}$ is an alkyl. Group $R^{11}$ is an alkoxy or a group of formula —$N(R^{13})_2$ where each $R^{13}$ is an alkyl.

Suitable alkyl groups for $R^{10}$, $R^{12}$, and $R^{13}$ and suitable alkoxy groups for $R^{10}$ and $R^{11}$ often have 1 to 20 carbon atoms. These groups often have at least 1 carbon atoms, at least 2 carbon atoms, at least 3 carbon atoms, or at least 4 carbon atoms and up to 20 carbon atoms, up to 16 carbon atoms, up to 12 carbon atoms, up to 10 carbon atoms, up to 6 carbon atoms, or up to 4 carbon atoms. In many embodiments, alkyl groups for $R^{10}$, $R^{12}$, and $R^{13}$ and the alkoxy groups for $R^{10}$ and $R^1$ have 1 to 10 carbon atoms, 1 to 6 carbon atoms, or 1 to 4 carbon atoms.

The photoinitiators of Formula (IV) can be prepared as described in WO2018/013330 (Griesgraber et al.) and WO2019/123124 (Lewandowski et al.). Specific examples of the photoinitiators include, but are not limited to, 1,1-bis(isopropoxycarbothioylsulfanyl)-2-propanone, 1,1-bis(diethylcarbamothioylsulfanyl)-2-propanone, methyl 2,2-bis(diethylcarbamothiolysulfanyl)acetate, methyl 2,2-bis (isopropoxycarbothiolysulfanyl)acetate, 2-ethylhexyl 2,2-bis(diethylcarbamothiolysulfanyl)acetate, 2-ethylhexyl 2,2-bis(isopropoxycarbothiolysulfanyl)acetate, octyl 2,2-bis (diethylcarbamothiolysulfanyl)acetate, tert-butyl 2,2-bis (isopropoxycarbothiolysulfanyl)acetate, and N,N-dibutyl-2,2-bis(isopropoxycarbothiolysulfanyl)acetate.

When exposed to ultraviolet radiation in the presence of monomers having (meth)acryloyl groups, the photoinitiators of Formula (IV) form two radicals as shown in the following reaction.

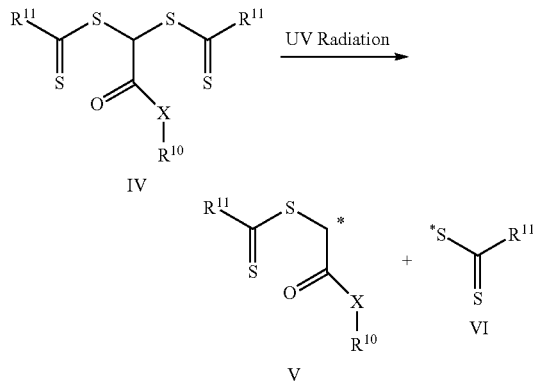

The radical of Formula (V) can react with the monomers forming a new radical of a progressively larger molecular weight with the reaction of each additional monomer. The radical of Formula (VI) can terminate the polymerization process but the resulting polymeric product can undergo photolysis with the formation of two radicals in the presence of ultraviolet radiation. One of these radicals is *S—(C=S)—$R^{11}$ and the other is a polymeric radical. The polymeric radical can react further with monomers that are present. The polymeric material will continue to grow in this manner in the presence of available monomers and ultraviolet radiation. No growth of the polymeric material can occur when exposure to ultraviolet radiation is terminated.

Typically, the A block is formed first. The first monomer of Formula (I) is combined with the photoinitiator of Formula (IV) to form a first reaction mixture. When exposed to ultraviolet radiation, photolysis of the photoinitiator and controlled radical polymerization of the first monomer occurs. A first polymeric material forms that contains the A block. The structure of the first polymeric material is shown in Formula (VII).

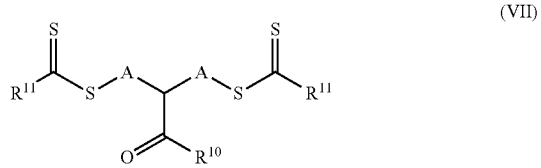

Polymeric material resulting from polymerization of the first reaction mixture can form on either side of the pendant —CH—(CO)—$R_{10}$ group and the length of polymeric chain formed on either may be the same or different. The polymeric material on either side of the pendant group that is formed from the first reaction mixture is represented by A. The entire structure between the two —S—(CS)—$R^{11}$ groups is considered a single A block. That is, polymer block A includes the pendant group —CH—(CO)—$R^{10}$.

Often, the only monomer in the first reaction mixture is the first monomer of Formula (I). That is, the A block is a homopolymer of the first monomer of Formula (I). Other monomers may be added if desired such as, for example, various monomers that can be used to alter the adhesion of the A block to various surfaces. In some embodiments, the A block is a copolymer of the first monomer of Formula (I) and a (meth)acrylate ester (i.e., (meth)acrylic acid ester). In some embodiments, the (meth)acrylate ester is an alkyl (meth)acrylate where the alkyl group has 1 to 20 carbon atoms, 1 to 12 carbon atoms, 1 to 8 carbon atoms, 1 to 6 carbon atoms, or 1 to 4 carbon atoms.

The amount of the optional (meth)acrylate ester included in the first block can in a range of 0 to 50 weight percent based on a total weight of monomers in the first reaction mixture used to form the A block. That is, the first reaction mixture can include 50 to 100 weight percent of the first monomer of Formula (I) and 0 to 50 weight percent of a (meth)acrylate ester based on a total weight of monomers in the first reaction mixture. For example, the amount of (meth)acrylate ester monomers can be at least 1 weight percent, at least 2 weight percent, at least 5 weight percent, at least 10 weight percent, at least 15 weight percent, or at least 20 weight percent and up to 50 weight percent, up to 40 weight percent, up to 30 weight percent, or up to 25 weight percent based on the total weight of monomers in the first reaction mixture. The remainder of the monomers are usually first monomers of Formula (I).

The second monomer can be added to the first polymeric material of Formula (VII) to form a second reaction mixture. Upon exposure to ultraviolet radiation, photolysis occurs again releasing the radical *S—(CS)—$R^{11}$. The second monomer can be polymerized to form a second block at both ends of the first polymeric material. The length of the polymeric chains formed at each end may be the same or different. When exposure to ultraviolet radiation ceases, the polymerization reaction terminates. The structure of the second polymeric material is shown in Formula (VIII) where each B is the polymeric chain formed from the second reaction mixture.

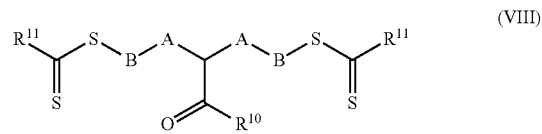

Formula (VIII) shows the structure for a BAB block copolymer.

It is often desirable to polymerize at least 85 mole percent of the first monomer prior to addition of the second monomer. In some embodiments, at least 90 mole percent, at least 95 mole percent, at least 97 mole percent, at least 98 mole percent, or at least 99 mole percent of the first monomer is reacted prior to addition of the second monomer. The higher the extent of reaction of the first monomer, the sharper the transition between the first block (A block) and the second blocks (B blocks).

Often, the only monomers in the second reaction mixture is the second monomer of Formula (II) plus any remaining unreacted first monomer of Formula (I). If the first monomers are essentially polymerized prior to formation of the B block, the B block is a homopolymer of the second monomer of Formula (II). Other monomers may be added if desired such as, for example various monomers that can be used to alter the repellency of the B block when the block copolymer is used as a coating on a surface. In some embodiments, the B block is a copolymer of the second monomer of Formula (II) and a (meth)acrylate ester. In some embodiments, the (meth)acrylate ester is an alkyl (meth)acrylate where the alkyl group has 1 to 20 carbon atoms, 1 to 12 carbon atoms, 1 to 8 carbon atoms, 1 to 6 carbon atoms, or 1 to 4 carbon atoms.

The amount of the optional (meth)acrylate ester included in the second block can in a range of 0 to 50 weight percent based on a total weight of monomers in the first reaction mixture used to form the B block. That is, the second reaction mixture can include 50 to 100 weight percent of the second monomer of Formula (II) and 0 to 50 weight percent of a (meth)acrylate ester based on a total weight of monomers in the second reaction mixture. For example, the amount of (meth)acrylate ester monomers can be at least 1 weight percent, at least 2 weight percent, at least 5 weight percent, at least 10 weight percent, at least 15 weight percent, or at least 20 weight percent and up to 50 weight percent, up to 40 weight percent, up to 30 weight percent, or up to 25 weight percent based on the total weight of monomers in the second reaction mixture. The remainder of monomers are usually second monomers of Formula (II).

The block copolymer often contains 1 to 30 weight percent A block and 70 to 99 weight percent B block based on a total weight of the block copolymer. If there is less than 1 weight percent of the A block, a coating of the block copolymer may not adhere sufficiently to a surface such as a metal-containing surface. If there is more than 30 weight percent of the A block copolymer, however, the amount of the hydrophobic ends may not be sufficient to provide good oil repellency to the coating. The amount of the A block is often at least 1 weight percent, at least 2 weight percent, at least 5 weight percent, at least 10 weight percent and up to 30 weight percent, up to 25 weight percent, up to 20 weight percent, or up to 15 weight percent based on the total weight of the block copolymer. The balance of the block copolymer is usually the B block. For example, the block copolymer can be 5 to 30 weight percent A block and 70 to 95 weight percent B block, 10 to 30 weight percent A block and 70 to 90 weight percent B block, 10 to 25 weight percent A block and 75 to 90 weight percent B block, or 10 to 20 weight percent A block and 80 to 90 weight percent B block. The weight percent values are based on a total weight of the block copolymer.

The block copolymer often has a weight average molecular weight in a range of 5,000 to 200,000 Daltons. The weight average molecular weight is often at least 5,000 Daltons, at least 10,000 Daltons, at least 20,000 Daltons, at least 30,000 Daltons, or at least 50,000 Daltons and can be up to 200,000 Daltons, up to 150,000 Daltons, up to 100,000 Daltons, or up to 50,000 Daltons.

Coating Compositions

In another aspect of the disclosure, a coating composition is provided that includes the block copolymer described herein plus an organic solvent. The block copolymer is dissolved or dispersed in the organic solvent. In addition to the organic solvent, the coating composition may optionally further contain water.

Representative organic solvents and solvent systems that include one or more different organic solvents include, but are not limited to, ketones, aliphatic or aromatic alcohols, alkanol amines, ethers, ether amines, esters, volatile linear and cyclic siloxanes, volatile polydimethylsiloxanes, isooctane, octane and mixtures thereof.

Exemplary organic solvents may include acetone, acetamidophenol, acetanilide, acetophenone, 2-acetyl-1-methylpyrrole, benzyl acetate, benzyl alcohol, methyl benzyl alcohol, alpha phenyl ethanol, trifluoro ethanol, benzyl benzoate, benzyloxyethanol, ethylene glycol phenyl ether (commercially available as DOWANOL EPh from Dow Chemical Co., Midland, Mich.), propylene glycol phenyl ether (commercially available as DOWANOL PPh from Dow Chemical Co.), amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-I-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL™ from Dow Chemical Co.), propylene glycol monobutyl ether (commercially available as Butyl PROPASOL from Dow Chemical Co.), ethyl 3-ethoxypropionate (commercially available as UCAR Ester EEP from Dow Chemical Co.), 2,2,4-Trimethyl-1,3-Pentanediol Monoisobutyrate (commercially available as UCAR Filmer IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Other exemplary volatile solvents would be isooctane, isododecane, linear or cyclic siloxane, such as hexamethyldisiloxane (HMDS), octamethylcyclotetrasiloxane, decamethylcyclopentasiloxane, and octamethyltrisiloxane, or a linear, branched or cyclic alkane, such as propane, isobutane, liquid butane (e.g., under pressure), pentane, hexane, heptane, octane, petroleum distillates, cyclohexane, fluorocarbons, such as trichloromonofluoromethane, dichlorodifluoromethane, dichlorotetrafluoroethane, tetrafluoroethane, heptafluoropropane, 1,1-difluoroethane, pentafluoropropane, perfluoroheptane, perfluoromethylcyclohexane, 1,1,1,2,-tetrafluoroethane, 1,1,1,2,3,3,3-heptafluoropropane, chlorofluorocarbons, in addition to liquid carbon dioxide, and combinations thereof.

As used herein, "volatile" has its standard meaning, that is, it can evaporate rapidly at normal temperatures and pressure. For example, a solvent can be volatile if one metric drop (1/20 milliliters, 50 microliters) of the solvent will evaporate completely between 20-25° C. within 5 minutes, or within 4 minutes, or within 3 minutes, or within 2 minutes, or within 1 minute, or within 30 seconds, or within 15 seconds.

Coating compositions of the present disclosure are preferably applied out of an organic solvent as a ready-to-use composition. A concentrated coating composition may need to be diluted, typically with additional organic solvent to form a ready-to-use coating composition. Thus, coating compositions of the present disclosure can be supplied as both ready-to-use products, concentrates, or as part of a grease or oil management system. In any coating composition, a mixture of block copolymers could be used if desired.

In some embodiments, coating compositions of the present disclosure include alcohol and/or other organic solvents in an amount of at least 0.01 weight percent, and often at least 0.05 weight percent, 0.1 weight percent, 0.5 weight percent, 1 weight percent or 2 weight percent, based on the total weight of a ready-to-use composition. In some embodiments, compositions of the present disclosure include alcohol and/or other organic solvents in an amount of up to 50 weight percent, and often up to 40 weight percent, up to 30 weight percent, up to 25 weight percent, up to 20 weight percent, up to 10 weight percent, or up to 5 weight percent based on the total weight of a ready-to-use composition.

In some embodiments, compositions of the present disclosure include an organic solvent in an amount of at least 1 weight percent, and often at least 5 weight percent, at least 10 weight percent, at least 20 weight percent, at least 30 weight percent, at least 40 weight percent, or at least 50 weight percent based on the total weight of a concentrated composition. In some embodiments, compositions of the present disclosure include alcohol and/or other organic solvents in an amount of up to 90 weight percent, and often up to 80 weight percent, up to 70 weight percent, or up to 60 weight percent, based on the total weight of a concentrated composition.

In certain embodiments, the block copolymer is present in an amount of at least 0.001 weight percent, at least 0.01 weight percent, at least 0.1, or at least 1 weight percent, based on a total weight of the coating composition. In certain embodiments, the block copolymer is present in an amount of up to 50 weight percent, up to 25 weight percent, up to 10 weight percent, up to 5 weight percent, up to 2 weight percent, up to 1 weight percent, or up to 0.1 weight percent, based on the total weight of the coating composition (e.g., a ready-to-use composition).

In some embodiments, the coating composition (preferably, aqueous coating composition) is a ready-to-use composition and the block copolymer is present in an amount of 0.001 weight percent to 0.1 weight percent, based on a total weight of the coating composition. The amounts can be at least 0.005 weight percent, at least 0.01 weight percent, or at least 0.05 weight percent and up to 0.1 weight percent, up to 0.08 weight percent, up to 0.05 weight percent, up to 0.02 weight percent, or up to 0.01 weight percent.

Significantly, such coating compositions are desirable because they include a block copolymer that provides both a polydiorganosiloxane group that provides easy cleaning capability and/or oil repellency plus phosphonic acid, phosphonate, phosphoric acid, and/or phosphate end groups that provides attachment to a metal-containing substrate.

Compositions of the present disclosure may be provided in a variety of viscosities. Thus, for example, the viscosity may vary from being water-like to being paste-like. They may also be provided in the form of gels, solids, or powders.

In certain embodiments, coating compositions of the present disclosure may further include one or more optional additives, provided they do not cause the block polymer to precipitate out of solution. Exemplary additives include surfactants, alkalinity sources, bleaching agents, dyes, fragrances, corrosion inhibitors, enzymes, thickeners, wetting and leveling agents, adhesion promoters, or combinations thereof.

Articles

In another aspect of the disclosure, an article is provided that includes a substrate and a coating layer positioned adjacent to the substrate, wherein the coating layer includes a block copolymer as described herein. The coating layer is a hardened (e.g., dried) coating layer that is usually formed by application of the coating composition as described above to the surface of the substrate.

As used herein, the term "metal-containing" can refer to elemental metals or alloys of metals. The term also includes surface oxides of such elemental metal or alloy.

In certain embodiments, the metal-containing substrate is made of stainless steel, aluminum, anodized aluminum, titanium, zinc, silver, a surface oxide thereof, or a combination thereof. In some specific embodiments, the metal-containing substrate includes stainless steel.

In certain embodiments, the metal-containing substrate forms at least a portion of an article including those in a home or commercial kitchen (e.g., refrigerator, dishwasher, stove, oven, microwave, exhaust hoods, fryers, grease traps, food-preparation tables, cabinets), in a restroom (e.g., toilet stall partitions, urinal partitions). Examples of such articles also include decorative or functional wall cladding such as in/on an elevator or escalator, walls in airports, hospitals, subway stations, train stations, malls, or in other commercial buildings. Examples of such articles also include decorative or functional panels in an automobile (e.g., decorative metallic parts in a car interior). Examples of such articles include consumer electronics, such as metal cases for electronic article (e.g., phones, tablets, and computers). Examples of such articles also include manufacturing equipment, and tools.

In certain embodiments, a hardened (e.g., dried) coating layer is less than 2 microns, less than 1 micron, or less than 100 nanometers (nm) thick. Typically, the thickness of the coating layer is self-limiting, such that it is only a monolayer thick, particularly if the coating is attached to the surface and the excess is removed. In certain embodiments, the hardened coating is at least 10 nm thick.

In certain embodiments, the substrate is flexible, such as a fibrous substrate. In certain embodiments, the fibrous substrate includes a polymeric material (i.e., polymeric fibers). In certain embodiments, the polymeric fibers include cellulose fibers, rayon fibers, cotton fibers, polyamide fibers, polyacrylic acid fibers, polyurethane fibers, polypropylene fibers, polyethylene fibers, polyethylene terephthalate fibers, or combinations thereof. In certain embodiments, the polymeric fibers include cellulose fibers, and the substrate is paper.

Such articles that include a flexible substrate preferably have a coating composition (which is in a liquid state) thereon. In certain embodiments, the substrate includes a fibrous material, which, for example, forms a wipe. In such embodiment, the coating adjacent the substrate may be a liquid coating composition impregnated within the fibrous substrate.

Methods

In a fourth aspect, a method of coating a substrate is provided. The method includes providing a coating composition that includes a) an organic solvent and b) a block copolymer as described in the first aspect. The block copolymer is dissolved or dispersed in the organic solvent. The method further includes applying the coating composition to the substrate. The method still further includes drying the coating composition to form a dried (or hardened) coating layer that is adjacent to the substrate.

A coating composition of the present disclosure may be applied to a substrate having a surface that includes a metal (i.e., a metallic surface or a metal-containing surface) using a variety of techniques, including, for example, spraying, brushing, rolling, dipping, knife coating, die-coating, or combinations thereof. For cleaning a surface, contaminants may be removed by one of these methods, or additional wiping or scrubbing may be needed. The coating composition may be dried to form a hardened coating by simply letting the organic solvent or solvent system evaporate, or by the application of heat, radiation, or a combination thereof.

In certain embodiments of a method of coating, providing a coating composition includes providing a wipe comprising a fibrous substrate having the coating composition impregnated therein; and applying the coating composition to the surface comprises wiping the coating composition on the surface.

In certain embodiments, the method of coating is a method of protecting a surface. That is, if there is a hardened (e.g., dried) coating of the block copolymer on the substrate, the substrate (e.g., substrate surface) is protected such that it can be cleaned easily with water to remove oil and dirt.

Easy cleaning properties (i.e., protection) of surfaces having a block copolymer of the present disclosure thereon is demonstrated by the Peanut Oil Contact Angle Test, which is described in the Example Section. Preferably, a hardened (e.g., dried) coating on a surface (e.g., a metal surface such as a stainless-steel surface) formed from a coating composition including a block copolymer of the present disclosure demonstrates a peanut oil static contact angle on a stainless-steel surface that is greater than 20 degrees, greater than 30 degrees, greater than 40 degrees, or greater than 50.

In certain embodiments, such easy-clean performance also occurs using coating compositions that include one or more block copolymers as described herein and one or more cleaning agents (e.g., surfactants and organic solvents).

EMBODIMENTS

Various embodiments are provided that include a block copolymer, a coating composition, an article, and a method of coating a substrate.

Embodiment 1A is a block copolymer. The block copolymer contains at least one A block and at least one B block. The A block contains multiple monomeric units derived from a first monomer comprising a (meth)acryloyl group and a phosphorous-containing group. The B block contains multiple monomer units derived from a second monomer comprising a (meth)acryloyl group and a poly(dialkylsiloxane) group.

Embodiment 2A is the block copolymer of embodiment 1A, wherein the block copolymer is a triblock copolymer having two B blocks and one A block.

Embodiment 3A is the block copolymer of embodiment 1A or 2A, wherein the first monomer is of Formula (I);

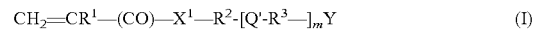

In Formula (I), group $R^1$ is hydrogen or methyl, group X is oxy or —NH—, group $R^2$ is an alkylene or heteroalkylene, group R is an alkylene, group $Q^1$ is —(CO)$X^2$—, —$NR^4$—(CO)—$X^2$—, group $X^2$ is oxy or —$NR^4$—, group $R^4$ is hydrogen or alkyl, variable m is 0 or 1, and group Y is a phosphorous-containing group.

Embodiment 4A is the block copolymer of Embodiment 3A, wherein the first monomer of Formula (I) is of Formula (I-A) or (I-B).

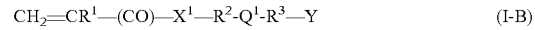

Embodiment 5A is the block copolymer of Embodiment 4A, wherein the first monomer of Formula (I-A) is of Formula (I-1) or Formula (I-2).

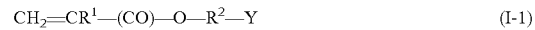

Embodiment 6A is the block copolymer of embodiment 4A, wherein the first monomer of Formula (I-B) is of Formula (I-3) or (I-4).

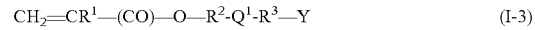

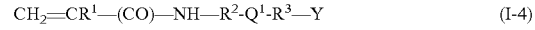

Embodiment 7A is the block copolymer of embodiment 6A, wherein the first monomer of Formula (I-3) is of Formula (I-5), (I-6), (I-7), or (I-8).

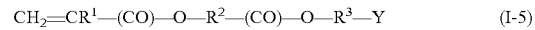

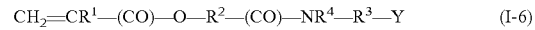

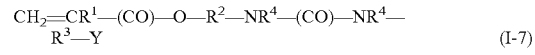

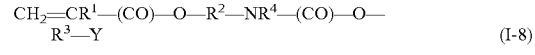

Embodiment 8A is the block copolymer of embodiment 6A, wherein the first monomer of Formula (I-4) can be of Formula (I-9), (I-10), (I-11), or (I-12).

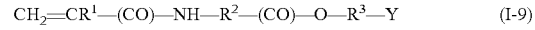

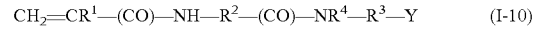

CH$_2$=CR$^1$—(CO)—NH—R$^2$—NR$^4$—(CO)—NR$^4$—
R$^3$—Y    (I-11)

CH$_2$=CR$^1$—(CO)—NH—R$^2$—NR$^4$—(CO)—O—
R$^3$—Y    (I-12)

Embodiment 9A is the block copolymer of embodiment 7A, wherein the first monomer of Formula (I-7) or (I-8) is of Formula (I-13).

CH$_2$=CR$^1$—(CO)—O—CH$_2$CH$_2$—NH—(CO)—
X$^2$—R$^3$—Y    (I-13)

Embodiment 10A is the block copolymer of embodiment 8A, wherein the first monomer of Formula (I-9) or (I-10) is of Formula (I-14).

CH$_2$=CR$^1$—(CO)—NH—C(CH$_3$)$_2$—(CO)—X$^2$—
R$^3$—Y    (I-14)

Embodiment 11A is the block copolymer of any one of embodiments 1A to 10A, wherein the second monomer is of Formula (II).

CH$_2$=CR$^5$—(CO)—X$^3$—R$^6$-[-Q$^2$-R$^7$—]$_n$—Z    (II)

In Formula (II), group R is hydrogen or methyl, group X$^3$ is oxy or —NH—, group R$^6$ is an alkylene or heteroalkylene, group R$^7$ is an alkylene, group Q$^2$ is —(CO)X$^4$— or —NR—(CO)—X$^4$—, group X$^4$ is oxy or —NR—, group R$^8$ is hydrogen or alkyl, variable n is equal to 0 or 1, and group Z is a monovalent poly(dialkylsiloxane) group.

Embodiment 12A is the block copolymer of embodiment 11A, wherein the second monomer of Formula (II) is of Formula (II-A) or (II-B).

CH$_2$=CR$^5$—(CO)—X$^3$—R$^6$—Z    (II-A)

CH$_2$=CR$^5$—(CO)—X$^3$—R$^6$-Q$^2$-R$^7$—Z    (II-B)

Embodiment 13A is the block copolymer of embodiment 12A, wherein the second monomer of Formula (II-A) is of Formula (II-1) or (II-2).

CH$_2$=CR$^5$—(CO)—O—R$^6$—Z    (II-1)

CH$_2$=CR$^5$—(CO)—NH—R$^6$—Z    (II-2)

Embodiment 14A is the block copolymer of embodiment 12A, wherein the second monomer of Formula (II-B) is of Formula (II-3) or (II-4).

CH$_2$=CR$^5$—(CO)—O—R$^6$-Q$^2$-R$^7$—Z    (II-3)

CH$_2$=CR$^5$—(CO)—NH—R$^6$-Q$^2$-R$^7$—Z    (II-4)

Embodiment 15A is the block copolymer of embodiment 14A, wherein the second monomer of Formula (II-3) is of Formula (II-5), (II-6), (II-7), or (II-8).

CH$_2$=CR$^5$—(CO)—O—R$^6$—(CO)—O—R$^7$—Z    (II-5)

CH$_2$=CR$^5$—(CO)—O—R$^6$—(CO)—NR$^8$—R$^7$—Z    (II-6)

CH$_2$=CR$^5$—(CO)—O—R$^6$—NR$^8$—(CO)—O—
R$^7$—Z    (II-7)

CH$_2$=CR$^5$—(CO)—O—R$^6$—NR$^8$—(CO)—NR$^8$—
R$^7$—Z    (II-8)

Embodiment 16A is the block copolymer of embodiment 14A, wherein the first monomer of Formula (II-4) can be of Formula (II-9), (II-10), (II-11), or (II-12).

CH$_2$=CR$^5$—(CO)—NH—R$^6$—(CO)—O—R$^7$—Z    (II-9)

CH$_2$=CR$^5$—(CO)—NH—R$^6$—(CO)—NR$^8$—R$^7$—Z    (II-10)

CH$_2$=CR$^5$—(CO)—NH—R$^6$—NR$^8$—(CO)—O—
R$^7$—Z    (II-11)

CH$_2$=CR$^5$—(CO)—NR—(CO)—NR$^8$—R$^7$—Z    (II-12)

Embodiment 17A is the block copolymer of embodiment 15A, wherein the second monomer of Formula (II-7) or (II-8) is of Formula (II-13).

CH$_2$=CR$^5$—(CO)—O—CH$_2$CH$_2$—NH—(CO)—
X$^4$—R$^7$—Z    (II-13)

Embodiment 18A is the block copolymer of embodiment 16A, wherein the second monomer of Formula (II-9) or (II-10) is of Formula (II-14).

CH$_2$=CR$^5$—(CO)—NH—C(CH$_3$)$_2$—(CO)—X$^4$—
R$^7$—Z    (II-14)

Embodiment 19A is the block copolymer of any one of embodiments 12A to 18A, wherein the dialkylsiloxane group Z is of Formula (III).

—Si(R$^8$)$_2$—O—[—Si(R$^8$)$_2$—O—]$_p$—Si(R$^8$)$_2$R$^9$    (III)

In Formula (III), each group R$^8$ is independently and alkyl having 1 to 10 carbon atoms, group R$^9$ is an alkyl having 1 to 20 carbon atoms, and p is an integer that is greater than or equal to 0.

Embodiment 20A is the block copolymer of any one of embodiments 1A to 19A, wherein the second monomer was a weight average molecular weight in a range of 500 Daltons to 50,000 Daltons.

Embodiment 21A is the block copolymer of any one of embodiments 1A to 20A, wherein the block copolymer comprises 1 to 30 weight percent A block and 70 to 99 weight percent B block based on a total weight of the block copolymer.

Embodiment 22A is the block copolymer of any one of embodiments 1A to 21A, wherein the block copolymer is of Formula (III).

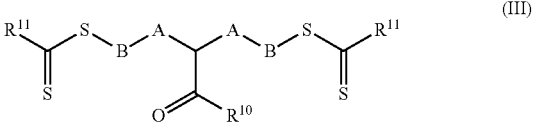

In Formula (III), each A is a first polymeric block that is a polymerized product of a first polymerizable composition comprising first monomers of Formula (I).

CH$_2$=CR$^1$—(CO)—X$^1$—R$^2$-[-Q$^1$-R$^3$—]$_m$Y    (I)

Each B is a second polymeric block that is a polymerized product of a second polymerizable composition comprising monomers of Formula (II).

CH$_2$=CR$^5$—(CO)—X$^3$—R$^6$-[-Q$^2$-R$^7$—]$_n$—Z    (II)

In Formulas (I), group R$^1$ is hydrogen or methyl, group X is oxy or —NH—, group R$^2$ is an alkylene or heteroalkylene, group R$^3$ is an alkylene, group Q$^1$ is —(CO)X$^2$— or —NR$^4$—(CO)—X$^2$—, group X$^2$ is oxy or —NR$^4$—, group R$^4$ is hydrogen or alkyl, the variable m is equal to 0 or 1, and group Y is a phosphorus-containing group. In Formula (II), group R$^5$ is hydrogen or methyl, group X$^3$ is oxy or —NH—, group R is an alkylene or heteroalkylene, group R$^7$ is an alkylene, group Q$^2$ is —(CO)X$^4$— or —NR—(CO)—X$^4$—, group X$^4$ is oxy or —NR—, group R$^8$ is hydrogen or alkyl, the variable n is equal to 0 to 1, and group Z is a monovalent poly(dialkylsiloxane) group. In Formula (III), group $R^{10}$ is an alkoxy or group of formula —$N(R^{12})_2$, group $R^{11}$ is an alkoxy or a group of formula —$N(R^{13})_2$, each group $R^1$ is an alkyl, and each group $R^{13}$ is an alkyl.

Embodiment 23A is the block copolymer of any one of embodiments 1A to 21A, wherein the A block is a homopolymer of the first monomer.

Embodiment 24A is the block copolymer of any one of embodiments 1A to 21A, wherein the A block is a polymerized product of a first monomer composition comprising 50 to 100 weight percent of the first monomer and 0 to 50 weight percent of an alkyl (meth)acrylate based on a total weight of monomers in the first monomer composition.

Embodiment 25A is the block copolymer of any one of embodiments 1A to 24A, wherein the B block is a homopolymer of the second monomer.

Embodiment 26A is the block copolymer of any one of embodiments 1A to 24A, wherein the B block is a polymerized product of a second monomer composition comprising 50 to 100 weight percent of the second monomer and 0 to 50 weight percent of an alkyl (meth)acrylate based on a total weight of monomers in the first monomer composition.

Embodiment 1B is a coating composition that include a) an organic solvent and b) a block copolymer. The block copolymer is dissolved or dispersed in the organic solvent. The block copolymer is the same as described in Embodiment 1A.

Embodiment 2B is the coating composition of embodiment 1B, wherein the block copolymer is according to any one of embodiments 2A to 26A.

Embodiment 3B is the coating composition of embodiment 1B or 2B, wherein the coating composition comprises 0.01 to 10 weight percent of the block copolymer based on a total weight of the coating composition.

Embodiment 1C is an article that includes a) a substrate and b) a coating layer positioned adjacent to the substrate, wherein the coating comprises a block copolymer of embodiment 1A.

Embodiment 2C is an article of embodiment 1C, wherein the coating comprises a block copolymer of any one of embodiments 2A to 26A.

Embodiment 3C is the article of embodiment 1C or 2C, wherein the substrate comprises a metal-containing surface.

Embodiment 4C is the article of embodiment 1C or 2C, wherein the substrate is a flexible fibrous substrate.

Embodiment 1D is a method of coating a substrate. The method includes providing a coating composition as described in Embodiment 1B. The method further includes applying the coating composition to the substrate. The method still further includes drying the coating composition to form a dried (or hardened) coating layer that is adjacent to the substrate.

Embodiment 2D is the method of embodiment 1D, wherein the coating is of embodiment 2B or 3B.

Embodiment 3D is the method of embodiment 1D or 2D, wherein the substrate comprises a metal-containing surface.

Embodiment 4D is the method of embodiment 1D or 2D, wherein the substrate is a flexible fibrous substrate.

Examples

TABLE 1

| Materials | |
|---|---|
| Description (Abbreviation) | Source |
| Hydroxyethylphosphonate dimethyl ester (CAS# 54731-72-5) | TCI America., Portland, OR |
| 4-Dimethylaminopyridine (DMAP) | Alfa Aesar, Ward Hill, MA |
| Triethylamine (TEA) | EMD, Burlington, MA |
| Acryloyl chloride | Sigma-Aldrich Corporation, St. Louis, MO |
| Bromotrimethylsilane (TMSBr) | Alfa Aesar, Ward Hill, MA |
| Methyl 2,2-bis(isopropoxycarbothioylsulfanyl)acetate | Prepared as described in Photoinitiator Example 2 of WO 2018/013330 (Griesgraber et al.) |
| 4,4-Dimethyl-2-vinyl-4H-oxazol-5-one (vinyldimethylazlactone, VDM) (CAS# 29513-26-6) | SNPE, Inc, Princeton, NJ |
| alpha-Monoaminopropyl terminated polydimethylsiloxane, $M_n$ about 800-1,200 Da (catalog # MCR-A11) | GELEST, Morrisville, PA |
| Stainless steel, 304C, deburred | McMaster Carr, Elmhurst, IL |

Monomer A. 2-Dimethoxyphosphorylethyl prop-2-enoate

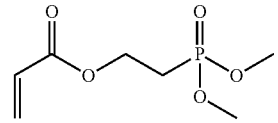

Hydroxyethylphosphonate dimethyl ester (5.0 g, 0.013 mol) was added to a 100 mL round bottom flask. Methylene chloride (50 mL) was added to the flask and the resulting mixture was stirred under an atmosphere of nitrogen. Triethylamine (4.5 mL, 0.013 mol) and DMAP (catalytic amount) were added and the mixture was stirred until the solids dissolved. The flask was then placed in an ice-water bath and stirred for 15 minutes. Acryloyl chloride (2.6 g, 0.013 mol) was added dropwise by syringe with the flask continuously maintained in the ice-water bath and under a nitrogen atmosphere. The ice bath was then removed and the reaction was stirred overnight at room temperature. The reaction mixture was then diluted with 60 mL of methylene chloride, quenched with saturated sodium bicarbonate and the two phases were separated. The aqueous portion was extracted with two additional portions of methylene chloride. The organic phases were combined and washed twice with a 5 weight percent aqueous solution of monosodium phosphate, followed by washing with water and finally brine. The organic portion was dried over sodium sulfate, filtered and concentrated under reduced pressure to provide 2-dimethoxyphosphorylethyl prop-2-enoate as an amber oil.
$^1$H-NMR (CDCl$_3$, 500 MHz) δ 2.22 (dt, 2H), 3.77 (m, 6H), 4.4 (dt, 2H), 5.87 (dd, 1H), 6.12 (dd, 1H), 6.44 (dd, 1H).

Monomer B.
2-Bis(trimethylsilyloxy)phosphorylethyl prop-2-enoate

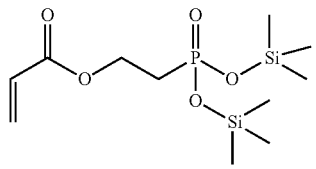 [SMILES: C=CC(=O)OCCP(=O)(O[Si](C)(C)C)O[Si](C)(C)C]

2-Dimethoxyphosphorylethyl prop-2-enoate (Monomer A) (3.5 g, 16.8 mmol) and dry dichloromethane (30 mL) were added to a 100 mL round bottom flask and maintained under a nitrogen atmosphere. The flask was placed in ice bath and TMSBr (5.4 g, 35.3 mmol) was added dropwise over a 2 minute period. The ice bath was then removed and the reaction was stirred for 3 hours at room temperature. The reaction was concentrated under reduced pressure to provide 2-bis(trimethylsilyloxy)phosphorylethyl prop-2-enoate (6 g) as a yellow oil. $^1$H NMR (CDCl$_3$, 500 MHz) δ 0.21-0.28 (m, 18H) 1.97-2.16 (m, 2H) 4.31 (dt, 2H) 5.79 (dd, 1H) 6.05 (dd, 1H) 6.37 (dd, 1H).

Monomer C

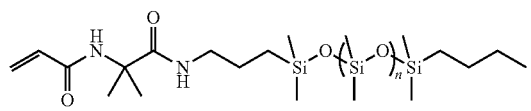

4,4-Dimethyl-2-vinyl-4H-oxazol-5-one (VDM) (0.5 g, 3.6 mmol) and alpha-monoaminopropyl terminated polydimethylsiloxane (3.6 g, 3.6 mmol) were mixed in a glass vial under a nitrogen atmosphere. Anhydrous dichloromethane (3 mL) was added to the reaction mixture to help solubilize the reagents. The reaction was stirred at room temperature for 16 hours and then concentrated under reduced pressure to provide Monomer C as a yellow oil.

Example 1. Synthesis of the A Block of the BAB Block Copolymer

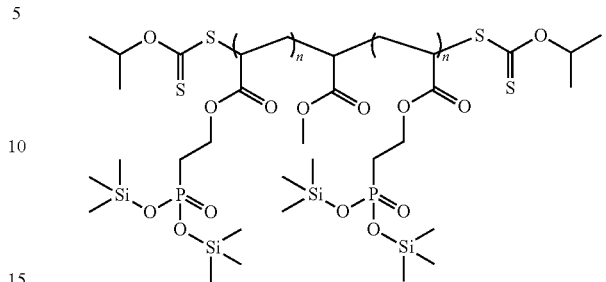

Monomer B (1 g, 3 mmol) and methyl 2,2-bis(isopropoxycarbothioylsulfanyl) acetate (0.209 g, 1.5 mmol) were added to a glass vial. The solution was purged with a stream of nitrogen for 10 minutes. The vial was sealed and placed on a bottle roller set at 30 revolutions per minute (rpm). Ultraviolet (UV)-initiated polymerization was conducted by irradiating the vial using a UV Benchtop lamp (UVP Blak Ray XX-15L, from Analytik Jena US, Beverly, Mass.) equipped with 2 bulbs (365 nm, 15 W) that was placed about 3 inches from the vial. The polymerization reaction was exposed to the UV radiation for about 18 hours. Anhydrous toluene (1 mL) was added to the reaction mixture to help solubilization. The sample was purged with nitrogen for 10 minutes and exposed to the UV light for an additional 5 hours. The reaction was stopped at 90 mole percent monomer conversion.

Example 2. Synthesis of the BAB Block Copolymer

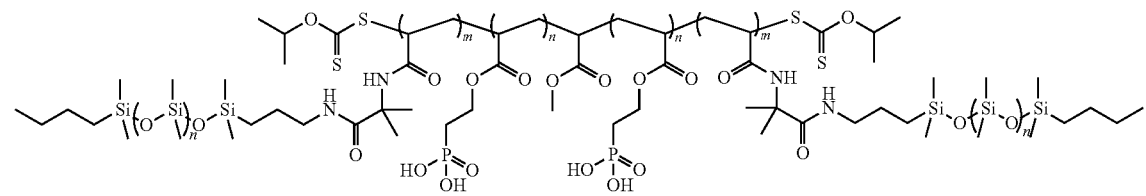

Monomer C (1.5 g) was dissolved in 2 mL of dry toluene and added to the vial containing Example 1 (the A block) (1 g). The reaction mixture was purged with a stream of nitrogen for 15 minutes. The vial was sealed and placed on a bottle roller set at 30 revolutions per minute (rpm). Ultraviolet (UV)-initiated polymerization was conducted by irradiating the vial using a UV Benchtop lamp (UVP Blak Ray XX-15L, from Analytik Jena US) equipped with 2 bulbs (365 nm, 15 W) that was placed about 3 inches from the vial. The polymerization reaction was exposed to the UV radiation for about 20 hours. Analysis of the product by $^1$H NMR (500 MHz, CDCl$_3$) confirmed complete conversion to the block copolymer. The solvent was removed under reduced pressure. Methanol (5 mL) and dichloromethane (2 mL) were added. The reaction mixture was stirred for 1 hour at room temperature and then concentrated under reduced pressure.

Example 3. Coating Composition

A 1 weight percent coating solution was prepared by diluting 0.1 g of the block copolymer solution prepared in Example 2 with 10 mL of methanol in a polyethylene bottle.

Example 4

A stainless-steel test panel (5 cm×2.5 cm) was soaked overnight in a bath containing potassium hydroxide (0.25 weight percent) dissolved in a 50:50 by volume mixture of isopropyl alcohol and water. The panel was removed from the bath and cleaned using Ajax Powder Detergent (obtained from the Colgate Palmolive Company, New York, N.Y.). The panel was scrubbed by hand with the Ajax Powder Detergent mixed with deionized water using a Polynit wipe PN-99, 100% PET (Contec Incorporated, Spartanburg, S.C.). The panel was rinsed with deionized water to remove any residue and air dried. Within 24 hours, the coating composition of Example 3 was evenly applied across the entire surface of one side of the panel. The coating composition was applied using a polyester knit wipe (PN-99 Polynit wipe from Contec) that had been imbibed with approximately 0.5 mL of the coating composition. The coating was allowed to dry overnight at room temperature. The surface was gently wiped with a methanol-moistened wipe (PN-99 Polynit wipe from Contec) to remove any loosely bound material from the surface.

Comparative Example A

The procedure for preparing the stainless-steel test panel described in Example 4 was followed with the exception that no coating solution was applied.

Example 5. Contact Angle Measurements

The contact angle analysis was performed on the coated surface of the test panel of Example 4 and the uncoated surface of the test panel of Comparative Example A using a Rame-Hart Model 500-F1 Advanced Goniometer (Rame-Hart Instrument Company, Succasunna, N.J.). Purified water [(obtained from a MILLI-Q Gradient Water Purification System (Merck Millipore Corporation, Billerica, Mass.)] and Planters 100% peanut oil (Planters brand obtained from Kraft Heinz Company, Chicago, Ill.) were each used as a test fluid. The results are reported in Table 2 for the static and dynamic (advancing and receding) contact angle measurements. The contact angle measurements are the average of at least three separate measurements.

TABLE 2

Contact Angle Analysis of Test Panels

| Test Panel | Water Contact Angle (degrees) | | | Peanut Oil Contact Angle (degrees) | | |
|---|---|---|---|---|---|---|
| | Static | Advancing | Receding | Static | Advancing | Receding |
| Example 4 | 106 | 110 | 13 | 52 | <5 | <5 |
| Comparative Example A | 73 | 85 | 15 | <10 | <5 | <5 |

Example 6. Peanut Oil Retraction Test

Test panels were prepared as described in Example 4 and equilibrated to room temperature prior to analysis. A 0.5 mL aliquot of 100% peanut oil (Planters brand obtained from the Kraft Heinz Company) was applied to the coated surface of the test panel of Example 4 and to the uncoated surface of the test panel of Comparative Example A using a disposable pipette. A 254 mm wide polyurethane foam applicator was used spread the peanut oil over the entire surface while the panels were laid flat on a horizontal surface. The samples were left at room temperature for 15 minutes for the oil to retract and equilibrate. The retraction of the peanut oil was measured by analyzing an image of the oil covered surface area using the open source image processing software ImageJ (NIH, Bethesda, Md.; https://imagej.nih.gov/ij/). The results are reported in Table 3 as the percentage of the test panel surface covered with peanut oil, where 100% represents peanut oil completely covering the test panel surface.

TABLE 3

| Test Panel | Percentage of Test Panel Surface Covered with Peanut Oil after 15 Minutes |
|---|---|
| Example 4 | 38% |
| Comparative Example A | 100% |

Example 7. Peanut Oil Travel Time Test

A test sample was prepared by adding three drops of 100% peanut oil (Planters brand obtained from the Kraft Heinz Company) at one edge of a coated stainless-steel panel that had been prepared according to Example 4. The drops were added at the same spot on the coated surface to create a single large drop. The test panel was then placed at a 20° angle on a support ramp and the time for the drop to travel 5 cm was measured in seconds. The test was repeated using an uncoated panel that had been prepared according to Comparative Example A. The tests were conducted at room temperature. The mean travel time results (n=3) are reported in Table 4.

TABLE 4

| Test Panel | Oil Drop Travel Time (seconds) |
|---|---|
| Example 4 | 5 |
| Comparative Example A | 10 |

What is claimed is:

1. A block copolymer comprising:
   at least one A block comprising multiple monomeric units derived from a first monomer comprising a (meth)acryloyl group and a phosphorous-containing group; and
   at least one B block comprising multiple monomer units derived from a second monomer comprising a (meth)acryloyl group and a poly(dialkylsiloxane) group.

2. The block copolymer of claim 1, wherein the block copolymer is a triblock copolymer having two B blocks and one A block.

3. The block copolymer of claim 1, wherein the first monomer is of Formula (I)

$$CH_2=CR^1-(CO)-X-R^2-[-Q^1-R^3-]_m-Y \qquad (I)$$

wherein
   $R^1$ is hydrogen or methyl;
   $X^1$ is oxy or —NH—;
   $R^2$ is an alkylene or heteroalkylene;
   $R^3$ is an alkylene;
   $Q^1$ is —(CO)$X^2$—, —$NR^4$—(CO)—$X^2$—;
   $X^2$ is oxy or —$NR^4$—;
   $R^4$ is hydrogen or alkyl;
   m is 0 or 1; and
   Y is a phosphorous-containing group.

4. The block copolymer of claim 1, wherein the second monomer is of Formula (II)

$$CH_2=CR^5-(CO)-X^3-R^6-[-Q^2-R^7-]_n-Z \qquad (II)$$

wherein
   $R^5$ is hydrogen or methyl;
   $X^3$ is oxy or —NH—;
   $R^6$ is an alkylene or heteroalkylene;
   $R^7$ is an alkylene;
   $Q^2$ is —(CO)$X^4$— or —$NR^8$—(CO)—$X^4$—;
   $X^4$ is oxy or —$NR^8$—;
   $R^8$ is hydrogen or alkyl;
   n is 0 or 1; and
   Z is a monovalent poly(dialkylsiloxane) group.

5. The block copolymer of claim 4, wherein the dialkylsiloxane group Z is of Formula (III)

$$—Si(R^8)_2—O—[—Si(R^8)_2—O—]_p—Si(R^8)_2R^9 \qquad (III)$$

wherein
   each $R^8$ is independently and alkyl having 1 to 10 carbon atoms; and
   $R^9$ is an alkyl having 1 to 20 carbon atoms; and
   p is an integer that is greater than or equal to 0.

6. The block copolymer of claim 1, wherein the second monomer was a weight average molecular weight in a range of 500 Daltons to 50,000 Daltons.

7. The block copolymer of claim 1, wherein the block copolymer comprises 1 to 30 weight percent A block and 70 to 99 weight percent B block based on a total weight of the block copolymer.

8. The block copolymer of claim 1, wherein the block copolymer is of Formula (VIII)

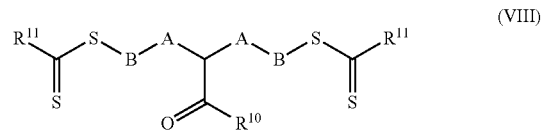

wherein
   each A is a first polymeric block that is a polymerized product of a first polymerizable composition comprising first monomers of Formula (I); and $$CH_2=CR^1-(CO)-X-R^2-[-Q^1-R^3-]_m-Y \qquad (I)$$

each B is a second polymeric block that is a polymerized product of a second polymerizable composition comprising monomers of Formula (II), $$CH_2=CR^5-(CO)-X^3-R^6-[-Q^2-R^7-]_n-Z \qquad (II)$$

wherein
   $R^1$ is hydrogen or methyl;
   $X^1$ is oxy or —NH—;
   $R^2$ is an alkylene or heteroalkylene;
   $R^3$ is an alkylene;
   $Q^1$ is —(CO)$X^2$— or —$NR^4$—(CO)—$X^2$—;
   $X^2$ is oxy or —$NR^4$—;
   $R^4$ is hydrogen or alkyl;
   m is 0 or 1;
   Y is a phosphorus-containing group;
   $R^5$ is hydrogen or methyl;
   $X^3$ is oxy or —NH—;
   $R^6$ is an alkylene or heteroalkylene;
   $R^7$ is an alkylene;
   $Q^2$ is —(CO)$X^4$— or —$NR^8$—(CO)—$X^4$—;
   $X^4$ is oxy or —$NR^8$—;
   R is hydrogen or alkyl;
   n is 0 or 1;
   Z is a monovalent poly(dialkylsiloxane) group;
   $R^{10}$ is an alkoxy or group of formula —$N(R^{12})_2$;
   $R^{11}$ is an alkoxy or a group of formula —$N(R^{13})_2$;
   each $R^{12}$ is an alkyl; and
   each $R^{13}$ is an alkyl.

9. A composition comprising an organic solvent and the block copolymer of claim 1.

10. The composition of claim 9, wherein the composition comprises 0.01 to 10 weight percent of the block copolymer based on a total weight of the composition.

11. An article comprising:
   a) a substrate; and
   b) a coating layer positioned adjacent to the substrate, wherein the coating layer comprises a block copolymer of claim 1.

12. The article of claim 11, wherein the substrate comprises a metal-containing surface.

13. The article of claim 11, wherein the substrate is a flexible fibrous substrate.

* * * * *

UNITED STATES PATENT AND TRADEMARK OFFICE
CERTIFICATE OF CORRECTION

PATENT NO. : 11,505,637 B1
APPLICATION NO. : 17/753262
DATED : November 22, 2022
INVENTOR(S) : Semra Colak Atan et al.

It is certified that error appears in the above-identified patent and that said Letters Patent is hereby corrected as shown below:

In the Claims

Column 27
Line 16, In Claim 3, delete "$CH_2=CR^1-(CO)-X-R^2-[-Q^1-R^3-]_m-Y$", and insert -- $CH_2=CR^1-(CO)-X^1-R^2-[-Q^1-R^3-]_m-Y$ --, therefor.

Column 28
Line 15, In Claim 8, delete "$CH_2=CR^1-(CO)-X-R^2-[-Q^1-R^3-]_m-Y$", and insert -- $CH_2=CR^1-(CO)-X^1-R^2-[-Q^1-R^3-]_m-Y$ --, therefor.

Signed and Sealed this
Ninth Day of May, 2023

Katherine Kelly Vidal
*Director of the United States Patent and Trademark Office*